(12) United States Patent  
Watanabe

(10) Patent No.: US 7,652,831 B2  
(45) Date of Patent: Jan. 26, 2010

(54) LENS BARREL

(75) Inventor: Takashi Watanabe, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 80 days.

(21) Appl. No.: 11/605,448

(22) Filed: Nov. 29, 2006

(65) Prior Publication Data

US 2007/0121223 A1 May 31, 2007

(30) Foreign Application Priority Data

Nov. 30, 2005 (JP) ............................ 2005-346329

(51) Int. Cl.
*G02B 7/02* (2006.01)
(52) U.S. Cl. .................. 359/811; 359/819; 359/821
(58) Field of Classification Search ............... 359/811, 359/819, 822, 830
See application file for complete search history.

(56) References Cited

U.S. PATENT DOCUMENTS 4,679,918 A * 7/1987 Ace ........................... 351/163

| | | | | |
|---|---|---|---|---|
| 5,663,838 | A * | 9/1997 | Hasushita et al. | ........... 359/692 |
| 5,798,876 | A * | 8/1998 | Nagano | ...................... 359/819 |
| 6,310,735 | B1 * | 10/2001 | Best et al. | ................... 359/819 |
| 6,771,438 | B2 * | 8/2004 | Nishimura et al. | .......... 359/819 |

FOREIGN PATENT DOCUMENTS

| | | |
|---|---|---|
| JP | 59-68710 | 4/1984 |
| JP | 62-245209 | 10/1987 |
| JP | 3-32044 | 5/1991 |
| JP | 5-188253 | 7/1993 |

* cited by examiner

*Primary Examiner*—Timothy J Thompson
(74) *Attorney, Agent, or Firm*—Young & Thompson

(57) ABSTRACT

A lens barrel for holding a lens system including at least a plastic lens disposed between two glass lenses separated from each other by a spacer ring comprises a cylindrical lens holding barrel fixedly holding the two glass and the plastic lenses, a cylindrical spacer ring fitted in the cylindrical lens holding barrel for elastically supporting the plastic lens therein and positioning the two glass lenses at a predetermined axial distance on opposite sides of the plastic lens.

12 Claims, 3 Drawing Sheets

LENS BARREL

BACKGROUND OF THE INVENTION

1. Field of the Invention

The present invention relates to a lens barrel for use with a projector, a camera or an endoscope and, more particular, to a lens barrel having a cylindrical spacer ring for regulating an axial distance between two lens components.

2. Description of Related Art

Practically, because of a strong demand for reduction in cost for a lens comprising a lens barrel and a lens system, it is usual to use plastic lens components for the lens system. Such a plastic lens component causes a greater change in dimension than glass lens components due to a change in ambient temperature and a change in ambient humidity. On the other hand, the lens barrel in which a lens system including a plastic lens component or plastic lens components are installed comprises a lens receiving barrel for receiving one or more plastic lens components, a lens holding ring for securely holding the plastic lens component in the lens receiving barrel and a cylindrical spacer ring for defining an axial distance of the plastic lens component from another lens component. These parts of the lens barrel are typically made of a metal which is less affected by a dimensional change due to a change in ambient temperature and/or a change in ambient humidity in order to be finished with high accuracy. If adjacent plastic lens components cause thermal expansion, the lens system encounters deterioration in optical performance due to a change in axial distance between the adjacent plastic lens components. Further, if firmly forcing the cylindrical spacer ring against a periphery of the plastic lens component, the remaining portion of the plastic lens component causes deformation and, in consequence, optical distortion, which leads to deterioration in its own optical performance. On the other hand, if loosely forcing the cylindrical spacer ring against a periphery of the plastic lens component, the plastic lens component is apt to become loose. In an attempt to solve the problems, there have been proposed various plastic lens holding devices. Japanese Patent Publication No. 3-32044 describes a lens holding device in which an elastic ring member is inserted between a plastic lens component and a lens holding ring so as thereby to absorb expansion of the plastic lens component. Unexamined Japanese Patent Publication No. 62-245209 describes a lens holding device in which a buffer ring having bits of elastic adhesive is positioned between a plastic lens component and another lens component or a stationary portion of a lens barrel so as to fixedly hold the plastic lens component. Further, Unexamined Japanese Patent Publication No. 5-188253 describes a lens holding mechanism in which a lens holding ring having tongue-shaped resiliently deformable claws is used to engage in recesses formed in a flange of a plastic lens component so as thereby to force the plastic lens component against a shoulder formed in a lens holding barrel. However, the use of elastic members for respective plastic lens components forming a lens system drives up costs. In addition, it is disadvantageous in light of a complex internal shape and a tapering bore to form a number of concave parts in a lens holding barrel for receiving plastic lens components therein. The lens holding barrel thus formed also drive up a manufacturing cost.

Consequentially, Unexamined Japanese Patent Publication No. 59-68710 describes a noble method for assembling a lens system into a lens barrel. In this method, lens components for forming the lens system are previously arranged in given axial positions using cylindrical spacer rings between respective adjacent lens components, respectively. The lens components is put in a metal mold for molding a lens barrel as they are remained in their axial positions and, subsequently, a molten resin is poured into the metal mold so as thereby to form a lens barrel with the lens components separately positioned by the cylindrical spacer rings therein as one whole.

However, in the case where a plastic lens component is fixed in position by a cylindrical spacer ring, a periphery or an edge of the plastic lens component against which the cylindrical spacer ring is forced expands in an axial direction upon a rise in temperature. This expansion of the plastic lens component entails a change in axial distance with respect to a lens component adjacent thereto as a necessary consequence, and hence a change in air space between the two adjacent lens components (which is defined as a distance between vertices of opposed surfaces of the two adjacent lens components). In consequence, since it is hard to make the optical performance of the lens system fall within tolerable limits due to changes in two optical factors, i.e. a change in axial distance and a change in air space, the mechanical feature in which a plastic lens component is forced against a cylindrical spacer ring, or vice versa, can not be employed in the conventional lens barrel.

SUMMARY OF THE INVENTION

It is therefore an object of the present invention to provide a lens barrel for holding a lens system including at least a plastic lens component which maintains an optical performance of the lens system within tolerable limits even though a spacer ring is used.

The foregoing object of the present invention is accomplished by a lens barrel for holding an optical lens system including at least two glass lens components spaced by a predetermined axial distance and a plastic lens component disposed between the two glass lens components which comprises a cylindrical lens holding barrel forming a part of the lens barrel which fixedly holds the two glass lens components separated from each other by spacer means fitted in the cylindrical lens holding barrel which positions the two glass lens components at a predetermined axial distance from each other, the spacer means comprising a cylindrical spacer ring for receiving the plastic lens component therein and a retaining member for retaining the plastic lens component in the cylindrical spacer ring. With the lens barrel, deterioration in optical performance encountered by the optical lens system falls within a tolerance.

The elastic retaining means may comprise an internal flange extending radially inward from the cylindrical spacer ring on which the plastic lens component is seated and elastic securing means such as an elastic retainer ring or a spring retainer secured in the cylindrical spacer ring for elastically forcing the plastic lens component against the inner flange so as thereby to fixedly hold the plastic lens component in the cylindrical spacer ring. The elastic securing means forces the plastic lens component against the internal flange and, at the same time, secures it in the cylindrical spacer ring when fitted in the cylindrical spacer ring, and besides absorbing axial deformation of the plastic lens component due to thermal expansion.

Furthermore, the elastic securing means may comprise an elastic adhesive lying in a slight cylindrical space provided between the cylindrical spacer ring and the plastic lens component Such the elastic adhesive used as the securing means absorbing axial and radial deformation of the plastic lens component due to thermal expansion. An example of the elastic adhesive is a UV cure adhesive which is elastic after curing.

BRIEF DESCRIPTION OF THE DRAWINGS

The foregoing and other objects and features of the present invention will be clearly understood from the following detailed description when reading with reference to the accompanying drawings wherein same or similar parts or mechanisms are denoted by the same reference numerals throughout the drawings and in which.

DETAILED DESCRIPTION OF THE PREFERRED EMBODIMENTS

Figure 1:
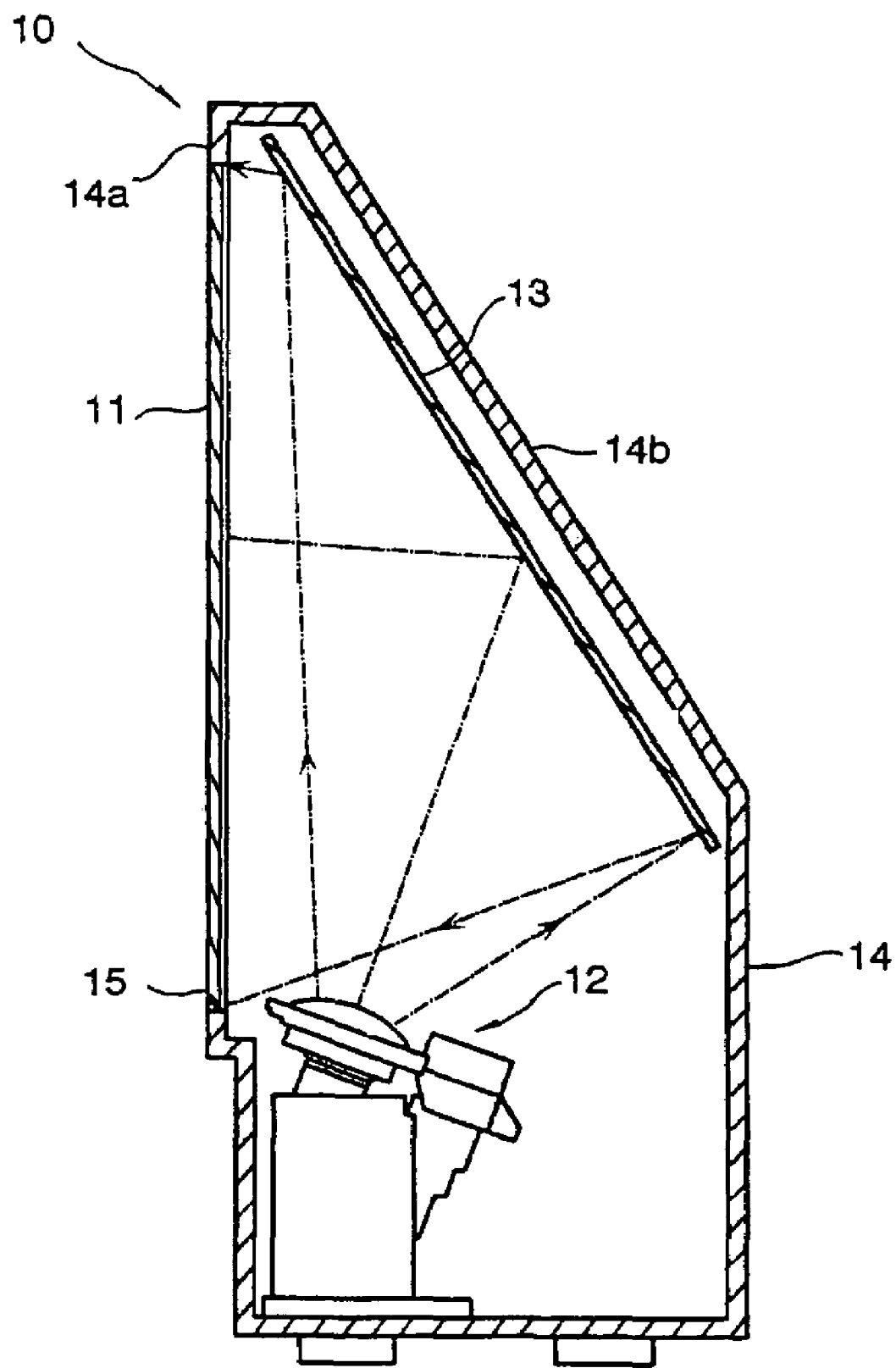
FIG. 1 is a schematic view of a rear projection type projector in which a projection lens unit including a lens barrel according to an embodiment of the present invention is installed.

In the following description, parts or mechanisms of a projector which are not direct importance to the invention and parts or mechanisms of a projector which are purely of conventional construction will not be described in detail since their construction and operation can be easily be arrived at by those skilled in the art Referring to the accompanying drawings in detail, and in particular, to FIG. 1 showing a projector 10 of a rear projection type in which a lens barrel according to an embodiment of the present invention is equipped, the projector 10 comprises a projector housing 14 generally shaped in an inverted trapezoid, a projection unit 12 including a projection lens unit, a reflective mirror 13 and a screen 11. Specifically, the projector housing 14 has a front wall 14a in which an opening 15 is formed and a rear wall 14b sloping with respect to the front wall 14a. The screen 11 is fitted in the opening 15. The reflective mirror 13 is mounted to the rear wall 3 with a reflective surface opposed to the screen 11. The projection unit 12 is disposed on a front bottom corner of the projector housing 14 so as to project an optical image toward the reflective mirror 13 and then onto the screen 11. The optical image projected on the screen 11 is viewed from front.

Figure 2:
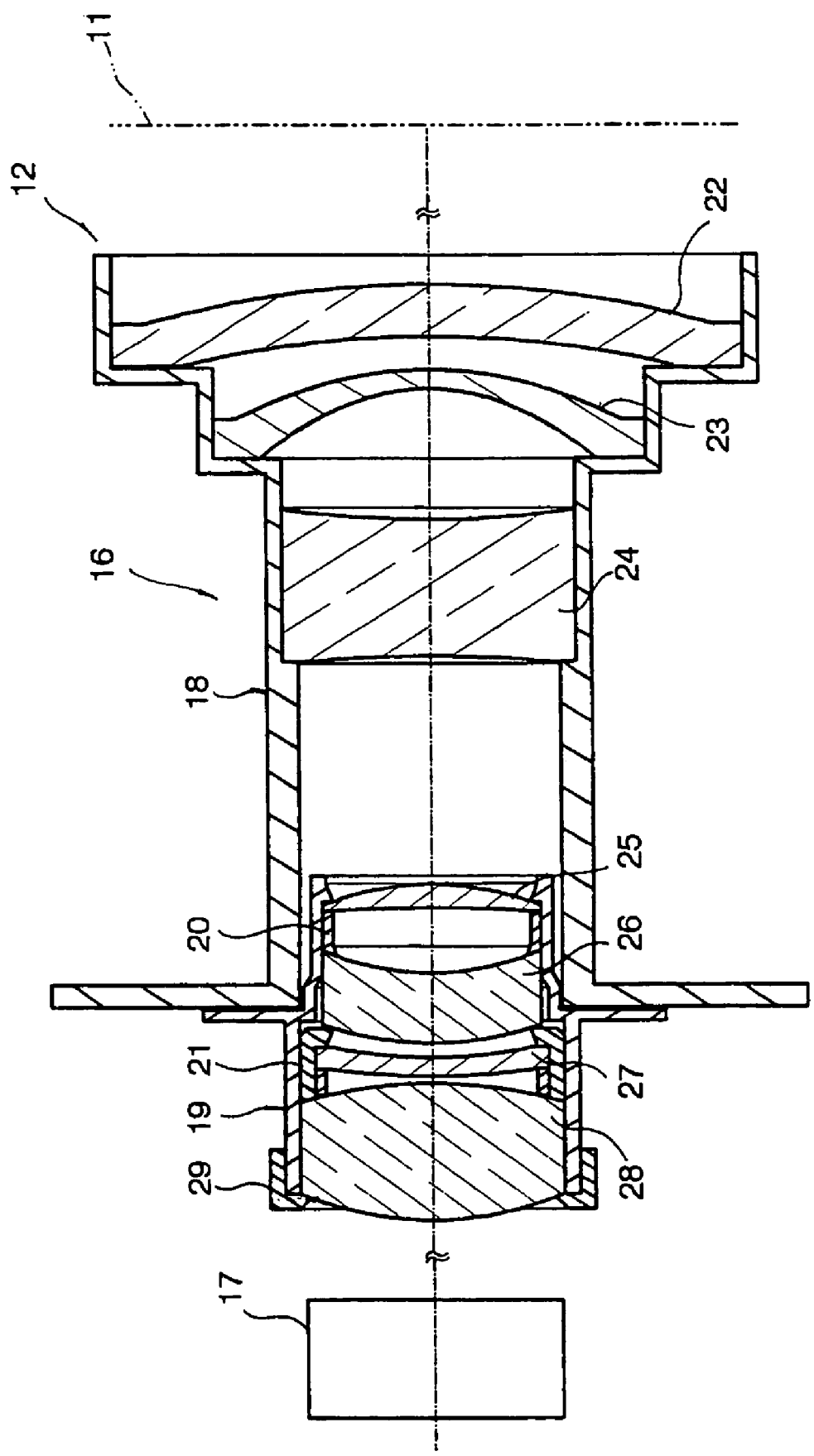
FIG. 2 is a schematic sectional view of the projection lens unit.

Referring to FIG. 2, the projection lens unit 12 comprises an optical image generator 17, only schematically shown, for generating an optical image and a projection lens 16 for projecting the optical image generated by the optical image generator 17 onto the reflective mirror 13 and then onto the screen 11 from behind. The optical image generator 17, which is known in various types and may take any type well known in the art, generates an optical image by modulating light than emanates from a light source (not shown) and uniformizing it in energy distribution by, for example, a rod integrator. The projection lens 16 comprises a projection lens system consisting of a plurality of, for example seven in this embodiment, lens components 22 to 28, first and second cylindrical lens holding barrels 18 and 19, first and second cylindrical spacer rings 20 and 21 and a tap ring 29. The first cylindrical lens holding barrel 18 is stationary with respect to the projection lens unit 12, and the second cylindrical lens holding barrel 19 is received, fixedly or movably, in the first cylindrical lens holding barrel 18. The projection lens system is installed partly in the first cylindrical lens holding barrel 18 and partly in the second cylindrical lens holding barrel 19. More specifically, the first to third lens components 22 to 24 are arranged in this other from a screen side (a front side) to an image source side (a rear side) and fixedly held in the first cylindrical lens holding barrel 18. The fourth to seventh lens components 25 to 29 are arranged in this order from the front side to the rear side and fixedly held in the second lens holding barrel 18. The first and second cylindrical spacer rings 20 and 21 have axial lengths predetermined according to design specifications of the lens system. At least the second cylindrical spacer ring 21 is made of metal. Each of the lens components 22 to 29 may consist of a single lens component or multiple lens components cemented one another. In this embodiment, the sixth lens component 27 is made of plastic and the remaining lens components 22 to 26 and 28 are made of glass.

Figure 3:
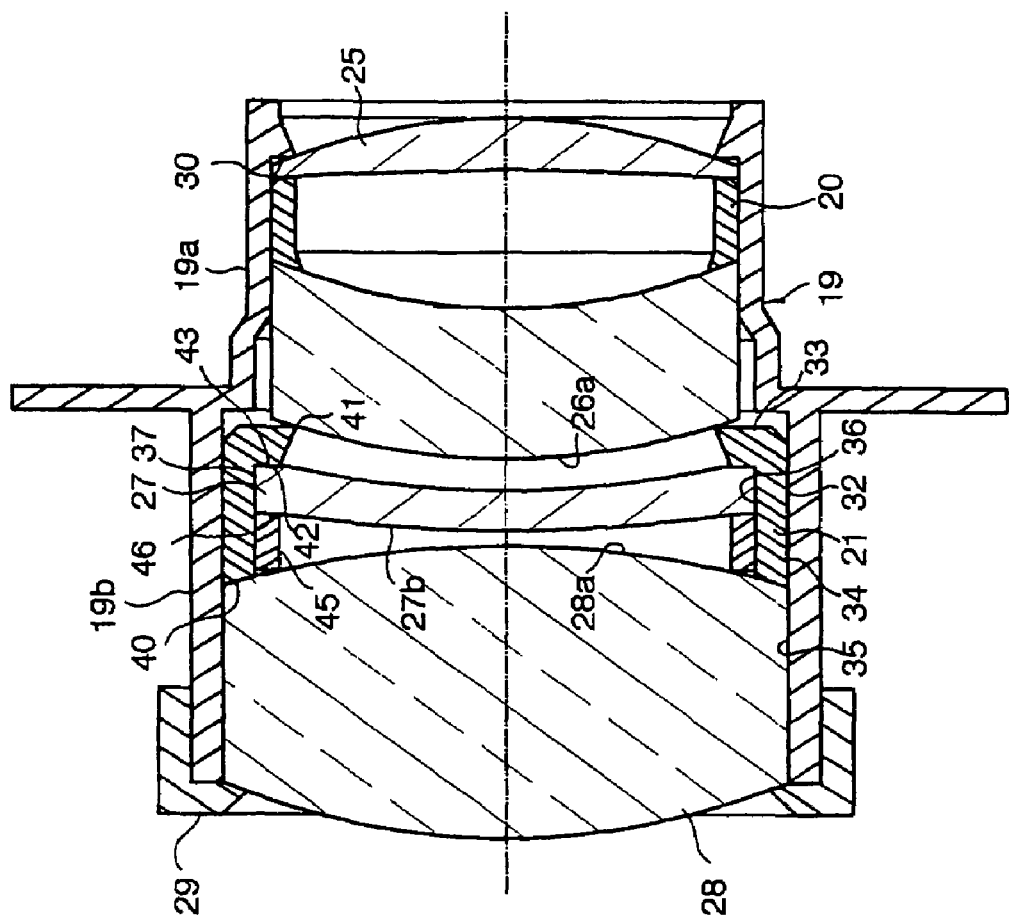
FIG. 3 is a schematic sectional view of a second lens holding barrel of the projection lens unit

Referring to FIG. 3, the second cylindrical lens holding barrel 19 has a front barrel portion 19a and a rear barrel portion 19b having an inner diameter larger than the front barrel portion 19a which are formed as an integral piece. The second cylindrical lens holding barrel 19, more specifically the front barrel portion 19a, has an annular abutting shoulder 30 extending laterally inward near a front end opening. Before installing and holding the fourth to seventh lens components 25 to 28 in the second cylindrical lens holding barrel 19, the second cylindrical spacer ring 21 is united with the sixth lens component 27. The second cylindrical spacer ring 21 has a cylindrical ring portion 32 and an annular flange portion 33 forming a part of retaining means which extends laterally inward so as to form an opening defined by an edge 41. The cylindrical ring portion 32 has an outer cylindrical wall 34 snugly fits in an inner cylindrical wall 35 of the front barrel portion 19a of the second cylindrical lens holding barrel 19 and an inner cylindrical wall 36 in which an outer wall 37 of the sixth lens component 27 snugly fits. It is desirable that the inner cylindrical wall 36 of the cylindrical ring portion 32 of the second cylindrical spacer ring 21 has an inner diameter slightly larger than an outer diameter of the sixth lens component 27 and that a clearance formed between the sixth lens component 27 and the inner cylindrical wall 36 of the cylindrical ring portion 32 is filled with an elastic adhesive. The annular flange portion 33 has a circular edge 41 and an annular abutting shoulder 42 working as front and rear backing means, respectively, for supporting a rear surface 26a of the fifth lens component 26 and a front flange portion 43 of the sixth lens component 27, respectively.

Preparatory to installing the lens components 25 to 28 in the second cylindrical lens holding barrel 19, the sixth lens component 27 is dropped in the cylindrical ring portion 32 of the second cylindrical spacer ring 21 until the front flange portion 43 of the sixth lens component 27 is brought into abutment with the annular abutting shoulder 42 of the annular flange portion 33 and, subsequently, an elastically deformable securing member 45 formed in the shape of a ring in this embodiment which forms a part of the retaining means is snugly fitted in the cylindrical ring portion 32 so as to force and hold down the rear flange portion 46 of the sixth lens component 27 against the annular abutting shoulder 42. It is desirable to join the elastic securing ring 45 to the inner cylindrical wall 36 of the cylindrical ring portion 32 of the second cylindrical spacer ring 21 at a plurality of circumferential positions with an adhesive. Thereafter, the fourth lens component 25 is dropped in the front barrel portion 19a of the second cylindrical lens holding barrel 19 and, then, the first cylindrical spacer ring 20 is fitted in the same so as to hold down the fourth lens component 25 against the annular abutting shoulder 30. Subsequently, after dropping the fifth lens component 26 in the front barrel portion 19a of the second cylindrical lens holding barrel 19 until the fifth lens component 26 is supported on the rear end of the first cylindrical spacer ring 20, the second cylindrical spacer ring 21 with the sixth lens component 27 and the elastic securing ring 45 united together therewith is fitted in the rear barrel portion 19b of the second cylindrical lens holding barrel 19 so that the circular edge 41 of the annular flange portion 33 is brought into abutment with the rear surface 26a of the fifth lens component 26. Thereafter, the seventh lens component 28 is dropped in the rear barrel portion 19b of the second cylindrical lens holding barrel 19 until a front surface 28a of the seventh lens component 28 is supported on the rear end 40 of the second cylindrical spacer ring 21. Finally, the tap ring 29 is fitted onto a rear end portion of the rear barrel portion 19b of the second cylindrical lens holding barrel 19 so as to hold down the seventh lens component 28 in an axial direction. In this way, the fourth to seventh lens components 25 to 28 are fixedly held in the second cylindrical lens holding barrel 19.

As was previously described, the second cylindrical spacer ring 21 is made of metal, and the sixth lens component 27 is made of plastic. In this instance, the plastic lens component 27 is apt to expand and contract more easily than a metal spacer 21 due to environmental variations. When the plastic lens component 27 expands due to a change in temperature, axial expansion of the plastic lens component 27 is absorbed through elastic deformation of the retaining means, more specifically the elastic securing ring 45 thereof and, at the same time, radial expansion of the plastic lens component 27 is absorbed by a clearance provided between the plastic lens component 27 and the metal cylindrical spacer ring 21 or by elastic deformation of an elastic adhesive if the clearance is filled with the elastic adhesive.

The elastic securing ring 45 for holding down the sixth lens component 27 against the annular abutting shoulder 42 of the second cylindrical spacer ring 21 may be replaced with an elastic adhesive such as a UV cure adhesive. The UV cure adhesive allows for accurate joining and fixing of the sixth lens component 27 to the second cylindrical spacer ring 21 in a short period of time. The UV cure adhesive causes initial cure in several tens of seconds under ultraviolet light in a wavelength range from 350 to 380 nm and completely cures with appropriate elasticity after a few minutes. It is desirable to apply an adhesive to several circumferential locations, more specifically three to six locations, of an interface between the inner cylindrical wall 36 of the second cylindrical spacer ring 21 and the rear surface 27a of the sixth lens component 27. It is desirable to apply an adhesive to diametrically opposed locations.

Although the front and rear backing means for supporting the rear surface 26a of the fifth lens component 26 and the front flange portion 43 of the sixth lens component 27, respectively, are provided together by the annular flange portion 33 of the second cylindrical spacer ring 21, nevertheless, these backing means may be provided by two annular flange portions formed separately from each other. Further, although, in the above embodiment, the lens component, such as the fifth lens component 26, the sixth lens component 27 or the seventh lens component 28, is abutted by a continuous edge or a continuous surface of the second cylindrical spacer ring 21, it may be abutted by discontinuous edges or discontinuous surfaces.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A lens barrel in which a lens system including at least front, intermediate and rear lens components arranged separately from one another in an axial direction is installed, said lens barrel comprising:
    a cylindrical lens holding barrel forming a part of said lens barrel for fixedly holding said front, intermediate and rear lens components; and
    spacer means fitted in said cylindrical lens holding barrel for positioning said front and rear lens components at a predetermined axial distance from each other,
    wherein said spacer means comprises a cylindrical spacer ring for receiving said intermediate lens component therein and a retaining member for retaining said intermediate lens component in said cylindrical spacer ring, and
    wherein said cylindrical spacer ring has an external wall fitted in said cylindrical lens holding barrel, and front and rear abutment ends at which said cylindrical spacer ring abuts on said front and said rear lens component, respectively.

2. The lens barrel as defined in claim 1, wherein said front and said rear lens component comprises glass lenses, respectively, and said intermediate lens component comprises a plastic lens.

3. The lens barrel as defined in claim 1, wherein said retaining member comprises an internal flange formed integrally with said cylindrical spacer ring on which said intermediate lens component is supported in one of opposite axial directions and an elastic securing member for elastically forcing said intermediate lens component against said internal flange so as thereby to secure said intermediate lens component in said cylindrical spacer ring.

4. The lens barrel as defined in claim 3, wherein said elastic securing member comprises an elastic ring fitted in said cylindrical spacer ring.

5. The lens barrel as defined in claim 3, wherein said elastic securing member comprises an elastic adhesive.

6. A lens barrel in which a lens system including at least front, intermediate and rear lens components arranged separately from one another in an axial direction is installed, said lens barrel comprising:
    a cylindrical lens holding barrel forming a part of said lens barrel for fixedly holding said front, intermediate and rear lens components; and
    spacer means fitted in said cylindrical lens holding barrel for positioning said front and rear lens components at a predetermined axial distance from each other,
    wherein said spacer means comprises a cylindrical spacer ring for receiving said intermediate lens component therein and a retaining member for retaining said intermediate lens component in said cylindrical spacer ring,
    wherein said front and said rear lens component comprises glass lenses, respectively, and said intermediate lens component comprises a plastic lens,
    wherein said retaining member comprises an internal flange formed integrally with said cylindrical spacer ring on which said intermediate lens component is supported in one of opposite axial directions and an elastic securing member for elastically forcing said intermediate lens component against said internal flange so as thereby to secure said intermediate lens component in said cylindrical spacer ring, and
    wherein said cylindrical spacer ring has an external wall fitted in said cylindrical lens holding barrel, and front and rear abutment ends at which said cylindrical spacer ring abuts on said front and said rear lens component, respectively.

7. The lens barrel as defined in claim 6, wherein said elastic securing member comprises an elastic ring fitted in said cylindrical spacer ring.

8. The lens barrel as defined in claim 6, wherein said elastic securing member comprises an elastic adhesive.

9. A lens barrel in which a lens system including at least front, intermediate and rear lens components arranged separately from one another in an axial direction is installed, said lens barrel comprising:

a cylindrical lens holding barrel forming a part of said lens barrel for fixedly holding said front, intermediate and rear lens components, each of said lens components being spaced from each other by an air space; and spacer means fitted in said cylindrical lens holding barrel for positioning said front and rear lens components at a predetermined axial distance from each other, wherein said spacer means comprises a cylindrical spacer ring for receiving said intermediate lens component therein and a retaining member for retaining said intermediate lens component in said cylindrical spacer ring, wherein said front and said rear lens component comprises glass lenses, respectively, and said intermediate lens component comprises a plastic lens, wherein said intermediate lens component is cylindrical, wherein said retaining member is ring-shaped, and wherein a diameter of an outermost circumference of the retaining member is equal to a diameter of the outermost circumference of the intermediate lens component.

10. The lens barrel as defined in claim 9, wherein said retaining member comprises an internal flange formed integrally with said cylindrical spacer ring on which said intermediate lens component is supported in one of opposite axial directions and an elastic securing member for elastically forcing said intermediate lens component against said internal flange so as thereby to secure said intermediate lens component in said cylindrical spacer ring.

11. The lens barrel as defined in claim 10, wherein said elastic securing member comprises an elastic ring fitted in said cylindrical spacer ring.

12. The lens barrel as defined in claim 10, wherein said elastic securing member comprises an elastic adhesive.

\* \* \* \* \*

UNITED STATES PATENT AND TRADEMARK OFFICE
CERTIFICATE OF CORRECTION

PATENT NO. : 7,652,831 B2  Page 1 of 1
APPLICATION NO. : 11/605448
DATED : January 26, 2010
INVENTOR(S) : Takashi Watanabe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 138 days.

Signed and Sealed this

Twenty-eighth Day of December, 2010

David J. Kappos
*Director of the United States Patent and Trademark Office*